(12) United States Patent
Kim et al.

(10) Patent No.: US 8,085,367 B2
(45) Date of Patent: Dec. 27, 2011

(54) LIQUID CRYSTAL DISPLAY DEVICE HAVING HIGH BRIGHTNESS

(75) Inventors: Sung-Ki Kim, Seoul (KR); Yong-Jin Cho, Seoul (KR); Hae-Yeol Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 937 days.

(21) Appl. No.: 11/148,566

(22) Filed: Jun. 9, 2005

(65) Prior Publication Data

US 2006/0092347 A1    May 4, 2006

(30) Foreign Application Priority Data

Sep. 22, 2004  (KR) .................. 10-2004-0076083

(51) Int. Cl.
*G02F 1/1335*  (2006.01)
*G02F 1/1333*  (2006.01)

(52) U.S. Cl. ................ 349/113; 349/62; 349/110

(58) Field of Classification Search .......... 349/113–114, 349/110, 44, 62–65
See application file for complete search history.

(56) References Cited

U.S. PATENT DOCUMENTS

| | | | | |
|---|---|---|---|---|
| 6,654,092 | B2 * | 11/2003 | Yanagawa et al. | 349/141 |
| 6,741,301 | B2 * | 5/2004 | Tsuji | 349/58 |
| 6,750,932 | B2 * | 6/2004 | Kim | 349/114 |
| 6,838,697 | B2 * | 1/2005 | Murade | 257/59 |
| 6,839,105 | B2 * | 1/2005 | Tanaka et al. | 349/110 |
| 7,304,696 | B2 * | 12/2007 | Yamagishi | 349/69 |
| 2003/0210367 | A1 * | 11/2003 | Nakano et al. | 349/113 |

FOREIGN PATENT DOCUMENTS

| | | | |
|---|---|---|---|
| CN | 1293767 | | 5/2001 |
| EP | 1069460 | A1 | 5/2001 |
| JP | 6-222355 | | 8/1994 |
| JP | 6-242411 | | 9/1994 |
| JP | 6331980 | | 12/1994 |
| JP | 900419 | | 3/1997 |
| JP | 10268786 | | 10/1998 |
| JP | 11183904 | | 7/1999 |
| JP | 2002-156628 | | 5/2002 |
| KR | 1020030030778 | | 4/2003 |
| WO | WO 02/052338 | * | 7/2002 |
| WO | WO 2004/040360 | A1 | 5/2004 |

* cited by examiner

*Primary Examiner* — Dung T. Nguyen
(74) *Attorney, Agent, or Firm* — McKenna Long & Aldridge LLP

(57) ABSTRACT

A liquid crystal display device includes: a liquid crystal panel; a backlight assembly for irradiating light onto the liquid crystal panel; and a reflection layer between the liquid crystal panel and the backlight assembly for increasing an amount of light incident onto the liquid crystal panel.

19 Claims, 3 Drawing Sheets

LIQUID CRYSTAL DISPLAY DEVICE HAVING HIGH BRIGHTNESS

The present invention claims the benefit of Korean Patent Application No. 2004-0076083 filed in Korea on Sep. 22, 2004, which is hereby incorporated by reference.

BACKGROUND OF THE INVENTION

1. Field of the Invention

The present invention relates to a liquid crystal display device, and particularly, to a liquid crystal display device having high brightness.

2. Description of the Related Art

Recently, as more and more portable electronic instruments, such as mobile phones, PDAs, notebook computers, and the like are being developed, lighter and more compact flat panel display devices capable of being used in these instruments have been required. As the demand for these flat panel display devices increases, more research as in LCD (Liquid Crystal Display), PDP (Plasma Display Panel), FED (Field Emission Display), VFD (Vacuum Fluorescent Display) and the like are actively being carried out. Considering such aspects as mass production capability, display driving ease, and high image quality, the LCD device is the display device among the flat panel display devices that is currently receiving the most attention.

In general, the LCD device is designed to display desired images by individually providing a data signal according to image information to pixels arranged in matrix. The data signals adjusts the light transmissivity of the pixels. FIG. 1 shows a cross-sectional view of a related art LCD device. As shown in FIG. 1, the LCD device includes a liquid crystal panel 1 having pixels arranged in matrix and a backlight assembly 2 for irradiating light onto the liquid crystal panel 1.

The liquid crystal panel 1 includes a TFT (Thin Film Transistor) array substrate 3 and a color filter substrate 5, which face each other and are attached to each other with a cell gap between them. A liquid crystal layer 7 fills the cell gap between the TFT array substrate 3 and the color filter substrate 5.

Although not shown in FIG. 1, a plurality of pixels are defined by gate lines and data lines on the TFT array substrate 3. A driving device, such as a thin film transistor 9, is formed in each pixel. A black matrix 11 is formed on the color filter substrate 3 to prevent light leakage in the regions where the gate lines, the data lines and the thin film transistor 9 are located. A color filter layer 13 having red, green, and blue filters for producing the full color spectrum is formed in the black matrix 11 of the color filter substrate.

The TFT array substrate 3 and the color filter substrate 5 respectively have a pixel electrode and a common electrode. Alignment layers 19a and 19b for aligning liquid crystal molecules are coated on the TFT array substrate 3 and the color filter substrate 5, respectively. The TFT array substrate 3 and the color filter substrate 5 are attached to each other by a sealing material 21. Lower and upper polarizers 23a and 23b for polarizing light coming out of the backlight assembly are formed on upper and rear surfaces of the liquid crystal panel 1, respectively.

The LCD device is a light receiving display device having the characteristic of displaying images by adjusting light transmission through the device without emitting light by itself. Thus, a separate unit for irradiating light onto the liquid crystal panel 1, namely, a backlight assembly 2 is provided at the rear surface of the liquid crystal panel 1. A light source 25 of the backlight assembly 2 is installed at a side surface of a light-guiding plate 27, a reflection sheet 29 is positioned at the rear surface of the light-guiding plate 27, and an optical sheet 31 is laminated on the light-guiding plate 27. Therefore, light irradiated from the light source 25 is condensed by the light-guiding plate 27 and passes through the optical sheets 31, including a diffusion sheet and a prism sheet. Thereafter, the light is irradiated onto the region of the liquid crystal panel 1 of the LCD device as indicated with arrow i in FIG. 1. As a result, characters or images can be displayed using the light passing through the liquid crystal panel 1.

In the color filter type LCD device according to the related art, most light i irradiated from the backlight assembly 2 is substantially absorbed or blocked. However, some light iii passes through the lower TFT array substrate 3, elements of the upper color filter substrate 5 and the liquid crystal layer 7, sequentially, as a part of the display. Only as much as about 3% to 5% of the initially irradiated light is displayed. Thus, the light efficiency is very low.

SUMMARY OF THE INVENTION

Accordingly, the present invention is directed to a liquid crystal display device having high brightness that substantially obviates one or more of the problems due to limitations and disadvantages of the related art.

An object of the present invention is to provide a liquid crystal display device having high brightness.

An object of the present invention is to provide a liquid crystal display device that minimizes light loss.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal display device includes: a liquid crystal panel; a backlight assembly for irradiating light onto the liquid crystal panel; and a reflection layer between the liquid crystal panel and the backlight assembly for increasing an amount of light incident onto the liquid crystal panel.

In another aspect, a method of manufacturing a liquid crystal display device includes: forming a liquid crystal panel; forming a backlight assembly for irradiating light onto the liquid crystal panel; and forming a reflection layer between the liquid crystal panel and the backlight assembly for increasing an amount of light incident onto the liquid crystal panel.

In another aspect, a liquid crystal display device includes: a liquid crystal panel includes a black matrix positioned along gate lines and data lines on a first side of a thin film transistor array substrate for preventing light leakage; a backlight assembly for irradiating light onto the liquid crystal panel; and a reflection layer between the liquid crystal panel having a same pattern as the black matrix.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Hereinafter, a liquid crystal display device according to an exemplary embodiment of the present invention will be described in detail with reference to the accompanying drawings.

Figure 1:
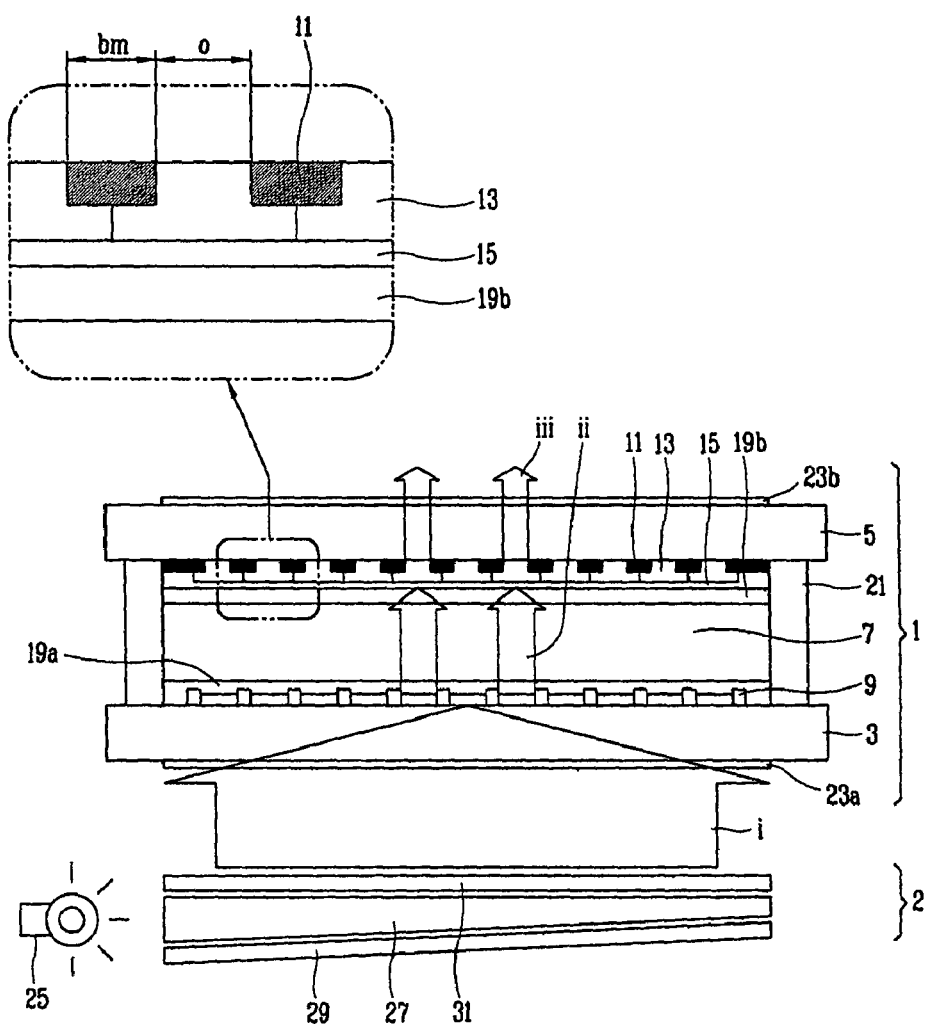
FIG. 1 shows a cross-sectional view of a related art LCD device.

In general, light efficiency in the related art liquid crystal display device, as shown in FIG. 1, is lower than about 5%. One of the main factors that lowers the light efficiency is the shielding action of a black matrix on the color filter substrate. The black matrix 11 is a light blocking region for absorbing light irradiating through the gate line, data line and the TFT 9 regions on the TFT array substrate 3 to prevent light leakage from these regions. As shown in FIG. 1, the black matrix 11 blocks and absorbs light in a significant area within the liquid crystal panel 1, and thus degrades the brightness level of the liquid crystal display device.

The black matrix 11 forms the light blocking region bm to prevent light from being passed through a predetermined region within the liquid crystal panel 1, and, as the arrows ii and iii indicate in FIG. 1, blocks part of the light ii from going on after passing through a liquid crystal layer 7. As a result, the black matrix 11 decreases the amount of light ii transmitted through the color filter substrate and thus lowers the brightness of the liquid crystal display device. However, the light blocking region bm formed by the black matrix, as aforementioned, prevents light leakage from the regions of the gate lines, the data lines, and the TFT, which are parts of the liquid crystal display device that can not be removed.

In an exemplary embodiments of the present invention, the brightness of the liquid crystal display device is improved by increasing the amount of light, which is irradiated from the backlight, through the liquid crystal panel. The brightness of the liquid crystal display device can be improved without increasing light output from the backlight assembly. More particularly, a reflection layer having the same pattern as the black matrix pattern of the liquid crystal display device is formed at the rear surface of the TFT array substrate, so as to reflect light, which is irradiated onto the light blocking region, back into the back light assembly for subsequent reflection into the light transmission region of the liquid crystal panel. As a result, the loss of light, which is caused by the absorbing action of the black matrix, is minimized. Accordingly, a condensation rate of light incident onto the light transmission region of the liquid crystal panel, namely, intensity of the light is increased. In other words, the light ongoing toward the black matrix on the second substrate is reflected by the reflection layer according to exemplary embodiments of the present invention, and thus returns the reflected light to the inside of the light-guiding plate and is then reflected again on a reflection plate at the lower surface of the light-guiding plate, and then condensed into the light transmission region of the liquid crystal panel along with other light from the backlight assembly.

Figure 2:
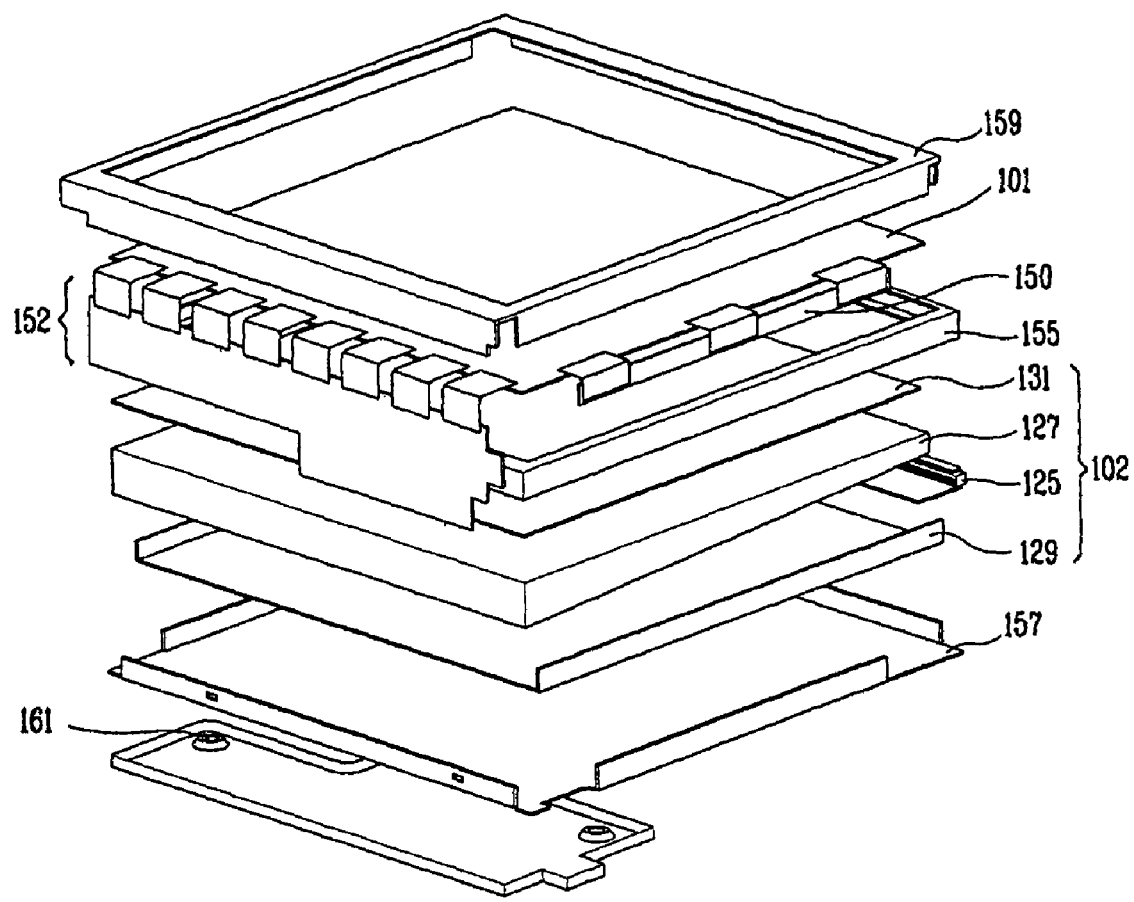
FIG. 2 shows a liquid crystal display device according to an exemplary embodiment of the present invention.

Construction of a liquid crystal display device will now be described in accordance with an exemplary embodiment of the present invention. FIG. 2 shows a liquid crystal display device according to an exemplary embodiment of the present invention. The liquid crystal display shown in FIG. 2 has a liquid crystal panel 101 with pixels arranged in matrix. A backlight assembly 102 is arranged at the rear surface of the liquid crystal panel 101.

A gate driving unit 150 and a data driving unit 152 are connected to the top surface of the liquid crystal panel 101. The gate driving unit 150 and the data driving unit 152 are coupled to the liquid crystal panel 101 to respectively provide a scan signal and image information to gate lines and data lines formed on the TFT array substrate of the liquid crystal panel 101. Accordingly, the pixels of the liquid crystal panel 101 can be driven.

The liquid crystal panel 101 includes a TFT array substrate and a color filter substrate facing and being attached to each other with a uniform cell gap between them. A liquid crystal layer is in the cell gap between the TFT array substrate and the color filter substrate. Although not shown in FIG. 2, the liquid crystal panel 101 is formed by adhering the TFT array substrate and the color filter substrate together. A pixel electrode and a common electrode are respectively formed on the TFT array substrate and the color filter substrate to apply an electric field across the liquid crystal layer. When a voltage of a data signal is applied across the pixel electrode and the common electrode, the liquid crystal in the liquid crystal layer is aligned according to the electric field between the common electrode and the pixel electrode. As a result, characters or images can be displayed by adjusting the amount of light transmitted by a pixel based upon the voltage of the data signal. In addition, in order to control the voltage of the data signal applied to the pixel electrode by a pixel, a switching device, such as a TFT or the like, is individually provided for each pixel on the TFT array substrate.

The backlight assembly 102 includes a light-guiding plate 127 positioned at the rear surface of the liquid crystal panel 101, a lighting light source 125 positioned at a side surface of the light-guiding plate 127 having a wedge shape, for example, and a reflection plate 129 positioned at the rear surface of the light-guiding plate 127. An optical sheet 131 is arranged between the liquid crystal panel 101 and the light-guiding plate 127. Light generated from the backlight assembly 102 is incident onto a side surface of the light-guiding plate 127 formed of a transparent material, and thereafter is guided by the light-guiding plate 127 inclined by a certain angle. Light reflected by the reflection plate 129 positioned at the rear surface of the light-guiding plate 127 is guided toward an upper surface by the light-guiding plate 127 to be incident onto the liquid crystal panel 101.

A diffusion sheet and a prism sheet can be used as the optical sheet 131 positioned between the liquid crystal panel 101 and the light-guiding plate 127. A protection sheet can additionally be positioned between the TFT array substrate 103 and the backlight assembly 102. However, the backlight assembly according to an exemplary embodiment of the present invention is not limited to an edge-type backlight assembly. The backlight assembly according to other exemplary embodiments of the present invention can be a direct-type backlight assembly in which a plurality of light sources are arranged at a rear surface of the liquid crystal panel so as to directly transmit light onto the front surface of the liquid crystal panel.

On the other hand, the liquid crystal panel 101 and the backlight assembly 102 are wrapped with a guide panel 155, and side surfaces of the wrapped crystal panel 101 and the backlight assembly 102 are supported by a lower cover 157. Moreover, edges of the upper surface of the liquid crystal panel 101 are compressed by a top case 159. The top case 159 is coupled to the guide panel 155. The guide panel 155 is coupled to the lower cover 157 and the lower cover 157 is wrapped with a cover shield 161.

Figure 3:
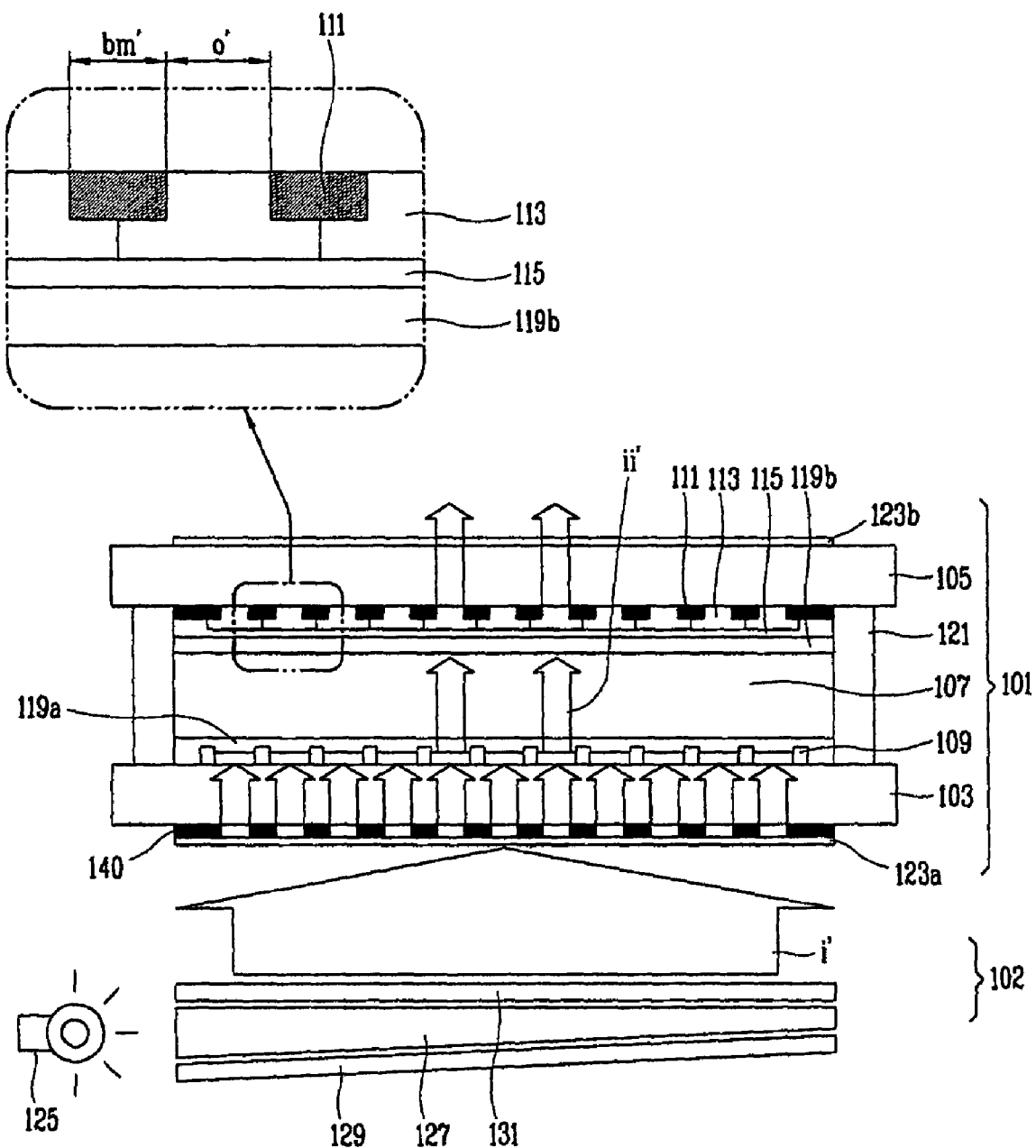
FIG. 3 is a cross-sectional view of the liquid crystal display device according to an exemplary embodiment of the present invention.

FIG. 3 is a cross-sectional view of the liquid crystal display device according to an exemplary embodiment of the present invention. As shown in FIG. 3, the liquid crystal panel 101 includes a TFT array substrate 103 and a color filter substrate 105 facing each other and attached to each other with a uniform cell gap between them. A liquid crystal layer 107 fills the uniform cell gap between the TFT array substrate 103 and the color filter substrate 105.

The TFT array substrate 103 has a plurality of pixels defined by gate lines and data lines. A driving device such as a TFT 109 is formed in each pixel. The color filter substrate 105 includes a black matrix 111 for forming a light blocking region bm' to prevent light leakage from regions of the gate lines, the data lines and the TFT 109. A color filter layer 113 is disposed in the black matrix 111 for displaying colors. Further, the TFT array substrate 103 and the color filter substrate 105 respectively have a pixel electrode and a common electrode 115. In the alternative, the liquid crystal panel can be an IPS (In-Plain Switching) mode liquid crystal display device having both the pixel electrode and the common electrode 115 formed on the TFT array substrate 103. Alignment layers 119a and 119b are coated on the TFT array substrate 103 and the color filter substrate 105 for aligning liquid crystal molecules of the liquid crystal layer 107.

The black matrix 111 is formed at the region on the color filter substrate 105 that corresponds to the region of the gate lines, the data lines and the TFT. The light blocking region bm' is thus defined within the liquid crystal panel. The black matrix 111 may be formed of a metal material, such as chrome (Cr) or chrome oxide (CrOx). However, when the IPS mode liquid crystal display device having both the common electrode and the pixel electrode on the TFT array substrate is adopted, those metal materials of the black matrix may have influence on a transverse electric field. Thus, a resin layer made of a black resin can be used instead of the metal materials.

The TFT array substrate 103 and the color filter substrate 105 are attached by a sealing material 121. Lower and upper polarizers 123a and 123b for polarizing light coming from the backlight assembly 102 are formed at upper and lower portions of the liquid crystal panel 101. Furthermore, the backlight assembly for irradiating light i' onto the liquid crystal panel 101 is positioned at the lower portion of the lower polarizer 123a. Here, the light irradiated from a lighting light source 125 of the backlight assembly 102 is condensed by a light-guiding plate 127. After the condensed light passes through an optical sheet 131 of a diffusion sheet and a prism sheet, the light is incident onto the region of the liquid crystal panel 101 of the liquid crystal display device as indicated with an arrow i' in the drawing.

A reflection layer 140, which has the same pattern as the black matrix 111 pattern formed on the color filter substrate 103, is positioned between the liquid crystal panel 101 and the lower polarizer 123b. The reflection layer 140 allows the light i' emitted from the backlight assembly 102 to be condensed onto a light transmission region o' of the liquid crystal panel 101. The reflection layer 140, as an opaque metal layer formed of molybderum (Mo), aluminum (Al), aluminum-neodymium (Al—Nd), cuprum (Cu), chrome (Cr), titanium (Ti) or alloys thereof, is made of a metal material capable of maximizing a reflection rate of light. Otherwise, the reflection layer 140 may be formed of any material which can maximize the reflection rate.

The reflection layer 140 is patterned in the same pattern as the light blocking region bm' formed by the black matrix 111, and hence reflects light irradiated toward the black matrix 111 among light emitted from the backlight assembly 102 back into the backlight assembly 102 so as to add more light into the outgoing path. As a result, the amount of light irradiated toward the light transmission region o' can be increased.

The reflection layer can be formed on the lower surface of the TFT array substrate 103 by a photo-etching process. In the alternative, the reflection layer can be formed separately from the liquid crystal panel 101 as a separate substrate and be positioned between the liquid crystal panel 101 and the backlight assembly 102.

The light going toward the black matrix 111 of the second substrate is reflected by the reflection layer 140 formed at the rear surface of the TFT array substrate so as to return into the light-guiding plate 127 of the backlight assembly 102. The light returned into the light-guiding plate 127 is reflected by the reflection plate 129 positioned at the lower portion of the light-guiding plate 127 to be supplied into the light transmission region o' of the liquid crystal panel 101. As a result, as shown in FIG. 3, the light outgoing toward the reflection layer 140 among the light i' emitted from the backlight assembly 102 is blocked by the reflection layer 140 and returns to the backlight assembly 102, so that the amount of light i' outgoing to the light transmission region o' is increased. Accordingly, light efficiency of the liquid crystal display device can be improved and high brightness can be realized.

As aforementioned, in the present invention, by forming the reflection layer at the rear surface of the TFT array substrate, light blocked by the black matrix returns into the light-guiding plate and the returned light is condensed into the light transmission region of the liquid crystal panel so as to be able to provide a liquid crystal display device with improved brightness. The present invention is not limited on the embodiment of this specification. The present invention can be applied to various types of liquid crystal display devices. For instance, the liquid crystal display device according to the present invention can be used in a direct-type backlight assembly as well as an edge-type backlight assembly. The liquid crystal panel can also be used in a TN mode liquid crystal panel, an IPS mode liquid crystal panel or a VA (Vertical alignment) liquid crystal panel. In addition, a shielding type black matrix of the liquid crystal display device may be formed on the TFT array substrate rather than on the color filter substrate. When the color filter substrate is attached to the TFT array substrate in this case, the extra width of the black matrix provided to accommodate mis-alignments between the two substrate can be narrowed so as to reduce an area of the light blocking region of the liquid crystal panel.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a liquid crystal panel includes a color filter substrate and a thin film transistor array substrate facing each other; a color filter layer and black matrix formed on the color filter substrate, wherein the black matrix is formed for preventing light leakage; an electrode on at least one of the two substrates for generating an electric field; a plurality of gate lines and data lines crossing each other on a first side of the thin film transistor array substrate defining pixel region; a thin film transistor formed at each crossing between the gate lines and the data lines; and a liquid crystal layer formed between the color filter substrate and the thin film transistor array substrate;
a backlight assembly for irradiating light onto the liquid crystal panel; and
a reflection layer formed on a rear surface of the thin film transistor array substrate to increase an amount of light incident onto the liquid crystal panel, wherein the reflection layer is formed on the rear surface of the thin film transistor array substrate corresponding to the black matrix, and has the same pattern as the black matrix, and wherein the reflection layer reflects light, which is irradiated from the backlight assembly toward the black matrix to the backlight assembly and changes the light outgoing path so as to increase a condensation rate of light irradiated toward the light transmission region of the liquid crystal panel, wherein the reflective layer is formed of an opaque metal layer.

2. The device of claim 1, wherein the liquid crystal panel is one of a twisted nematic mode liquid crystal panel, an in-plain switching mode liquid crystal panel, and a vertical alignment liquid crystal panel.

3. The device of claim 1, wherein the reflection layer is on a second side of the thin film transistor array substrate opposite to a first side of the liquid crystal panel.

4. The device of claim 1, wherein the reflection layer is formed of one of molybderum (Mo), aluminum (Al), aluminum-neodymium (Al—Nd), cuprum (Cu), chrome (Cr), titanium (Ti) and alloys thereof.

5. The device of claim 1, wherein the backlight assembly is one of an edge-type backlight assembly and a direct-type backlight assembly.

6. The device of claim 1, further comprising an upper polarizer and a lower polarizer arranged at first and second sides of the liquid crystal panel, respectively, for polarizing light.

7. The device of claim 1, wherein the opaque metal layer includes molybderum (Mo), aluminum (Al), aluminum-neodymium (Al—Nd), cuprum (Cu), chrome (Cr), titanium (Ti) or alloys thereof.

8. The device of claim 1, wherein the backlight assembly includes a light-guiding plate positioned at a rear surface of the liquid crystal panel, a lighting light source positioned at a side surface of the light-guiding plate, and a reflection plate positioned at the rear surface of the light-guiding plate and an optical sheet is arranged between the liquid crystal panel and the light-guiding plate.

9. A method of manufacturing a liquid crystal display device comprising:
forming a liquid crystal panel includes a color filter substrate and a thin film transistor array substrate facing each other; a color filter layer and black matrix formed on the color filter substrate, wherein the black matrix is formed for preventing light leakage; an electrode on at least one of the two substrates for generating an electric field; a plurality of gate lines and data lines crossing each other on a first side of the thin film transistor array substrate defining pixel region; a thin film transistor formed at each crossing between the gate lines and the data lines; and a liquid crystal layer formed between the color filter substrate and the thin film transistor array substrate;
forming a backlight assembly for irradiating light onto the liquid crystal panel;
forming a reflection layer on a rear surface of the thin film transistor array substrate to increase an amount of light incident onto the liquid crystal panel, wherein the reflection layer is formed on the rear surface of the thin film transistor array substrate corresponding to the black matrix, and has the same pattern as the black matrix, and wherein the reflection layer reflects light, which is irradiated from the backlight assembly toward the black matrix to the backlight assembly and changes the light outgoing path so as to increase a condensation rate of light irradiated toward the light transmission region of the liquid crystal panel, wherein the reflective layer is formed of an opaque metal layer; and
arranging an upper polarizer and a lower polarizer at first and second sides of the liquid crystal panel for polarizing light, respectively.

10. The method of claim 9, wherein the reflection layer is formed on a second side of the thin film transistor array substrate opposite to the first side of the liquid crystal panel by a photo-etching process.

11. The method of claim 9, wherein the reflection layer is formed separately from the liquid crystal panel and installed between the liquid crystal panel and the backlight assembly.

12. The method of claim 9, wherein the opaque metal layer includes molybderum (Mo), aluminum (Al), aluminum-neodymium (Al—Nd), cuprum (Cu), chrome (Cr), titanium (Ti) or alloys thereof.

13. The method of claim 9, wherein the backlight assembly includes a light-guiding plate positioned at a rear surface of the liquid crystal panel, a lighting light source positioned at a side surface of the light-guiding plate, and a reflection plate positioned at the rear surface of the light-guiding plate and an optical sheet is arranged between the liquid crystal panel and the light-guiding plate.

14. A liquid crystal display device comprising:
a liquid crystal panel including a black matrix positioned along gate lines and data lines on a first side of a thin film transistor array substrate for preventing light leakage;
a backlight assembly for irradiating light onto the liquid crystal panel;
a reflection layer formed at a rear surface of the thin film transistor array substrate to increase an amount of light incident onto the liquid crystal panel, wherein the reflection layer is formed at the rear surface of the thin film transistor array substrate corresponding to the black matrix, and has the same pattern as the black matrix, and wherein the reflection layer reflects light, which is irradiated from the backlight assembly toward the black matrix to the backlight assembly and changes the light outgoing path so as to increase a condensation rate of light irradiated toward the light transmission region of the liquid crystal panel, wherein the reflective layer is formed of an opaque metal layer; and
an upper polarizer and a lower polarizer arranged at first and second sides of the liquid crystal panel for polarizing light, respectively.

15. The device of claim 14, wherein the reflection layer is on a second side of the thin film transistor array substrate opposite to the first side of the liquid crystal panel.

16. The device of claim 14, wherein the reflection layer is separate from the liquid crystal panel and positioned between the liquid crystal panel and the backlight assembly.

17. The device of claim 14, wherein the backlight assembly is one of an edge-type backlight assembly and a direct-type backlight assembly.

18. The device of claim 14, wherein the opaque metal layer includes molybderum (Mo), aluminum (Al), aluminum-neodymium (Al—Nd), cuprum (Cu), chrome (Cr), titanium (Ti) or alloys thereof.

19. The device of claim 14, wherein the backlight assembly includes a light-guiding plate positioned at a rear surface of the liquid crystal panel, a lighting light source positioned at a side surface of the light-guiding plate, and a reflection plate positioned at the rear surface of the light-guiding plate and an optical sheet is arranged between the liquid crystal panel and the light-guiding plate.

\* \* \* \* \*